Feb. 12, 1957 — L. E. THATCHER — 2,781,430

CONTROL DEVICE

Filed May 2, 1955 — 2 Sheets-Sheet 1

Inventor:
Lewis E. Thatcher
By Gary, Desmond & Parker
Attys.

Feb. 12, 1957 — L. E. THATCHER — 2,781,430
CONTROL DEVICE
Filed May 2, 1955 — 2 Sheets-Sheet 2
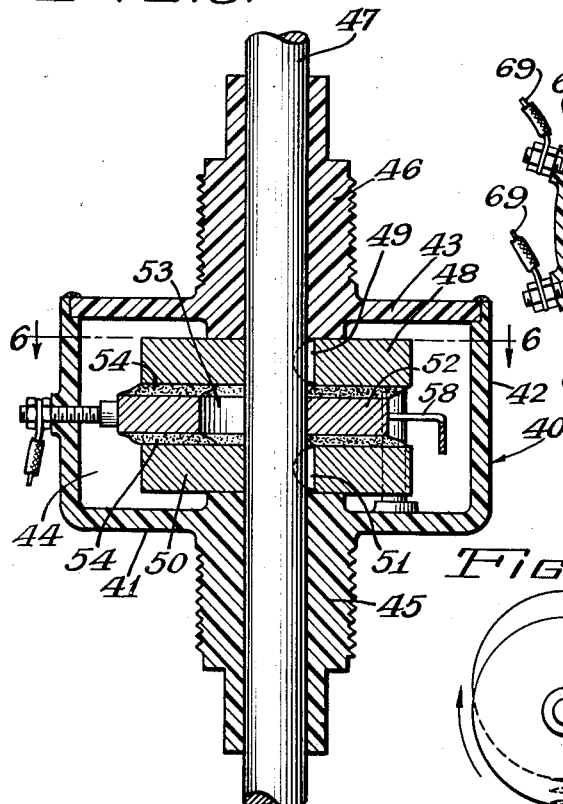
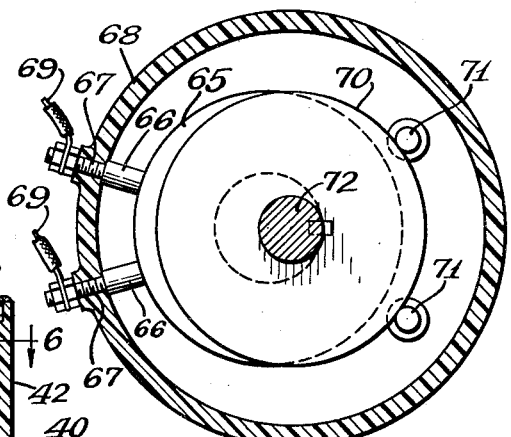
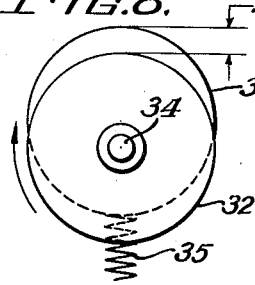
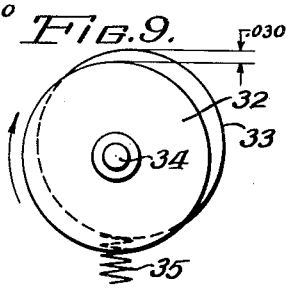
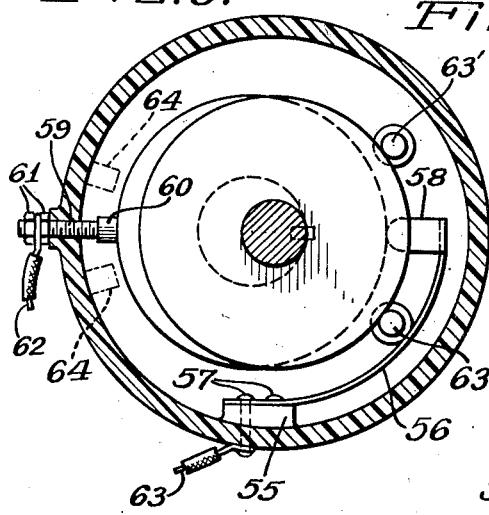
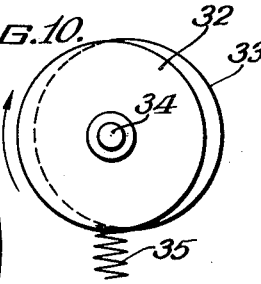
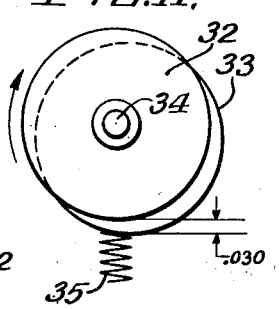
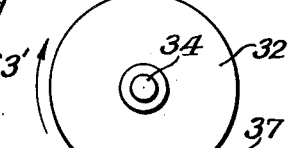
Inventor:
Lewis E. Thatcher
By Gary, Desmond & Parker Attys.

United States Patent Office 2,781,430
Patented Feb. 12, 1957

2,781,430

CONTROL DEVICE

Lewis E. Thatcher, Chicago, Ill., assignor to Gaylord Products, Incorporated, Chicago, Ill., a corporation of Delaware Application May 2, 1955, Serial No. 505,478

13 Claims. (Cl. 200—80)

This invention relates to improvements in a device for exerting an actuating pressure in response to the rate of rotation of a rotating body, and refers particularly to a device for actuating an electric switch to close or open an electric circuit in response to the rate of rotation of a rotating body.

In many operations it is desirable to exercise a predetermined control or produce a predetermined signal in response to the rate of movement of a body. In most instances, the movement of a body, if not rotary, may be converted to a proportional rotation in simple fashion, so that in substantially all cases a rotating body moving at a predetermined rate of speed can be employed, through the agency of the present invention, to exercise a predetermined control or produce a predetermined signal.

By way of example, but not of limitation, it may be desired to actuate an anticreep device for an automotive vehicle in response to a minimum or no motion of the vehicle. In such case, the speedometer cable of the vehicle may serve conveniently as the rotating body of reference with which the present invention may be used whereby when the speedometer cable moves at a predetermined minimum rate of speed or completely stops, the anticreep mechanism is brought into operation.

Of course, other uses may be found for the device comprising the present invention, and if used upon a vehicle, other bodies which rotate in proportion to the rectilinear speed of the vehicle may be employed as the rotating body of reference instead of the speedometer cable.

The objects, advantages and features of the present invention will be apparent from the accompanying drawings and following detailed description.

In the drawings,

Fig. 5 is a sectional elevation of a modification of the invention.

Fig. 6 is a transverse sectional view taken on line 6—6 of Fig. 5.

Fig. 7 is a view similar to Fig. 6 illustrating another modification of the invention.

Figs. 8, 9, 10, 11 and 12 are diagrammatic views illustrating the basic concept of the present invention.

Figure 1:
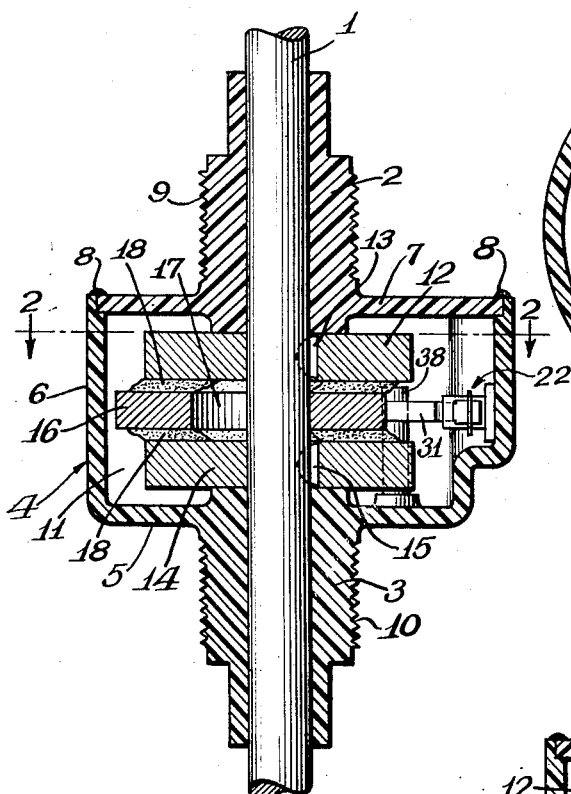
Fig. 1 is a sectional elevational view of a device including the concepts of the present invention.
Figure 3:
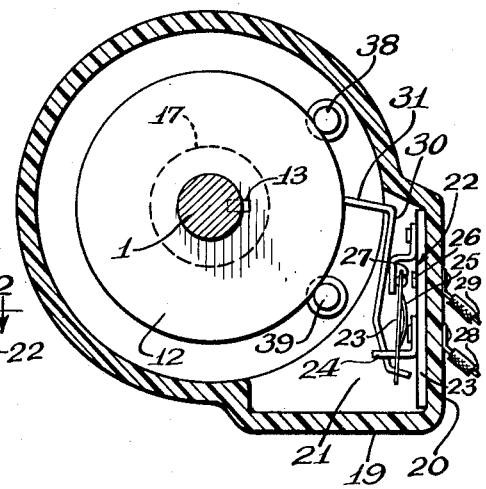
Fig. 3 is a view similar to Fig. 2 showing the driven rotor in concentric position.
Figure 4:
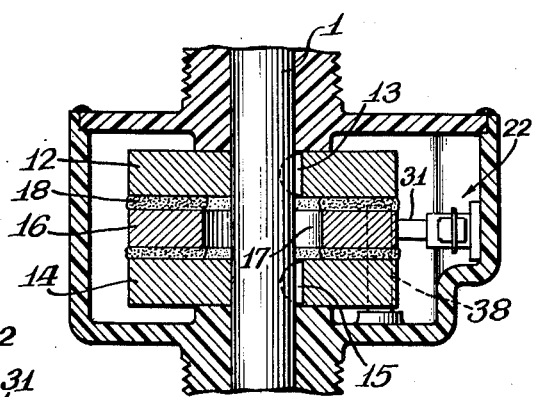
Fig. 4 is a view similar to Fig. 1 showing the driven rotor in concentric position.

Referring in detail to the drawings, 1 indicates a shaft which may comprise the rotating body of reference, that is, the body, the rate of rotation of which is to be employed to actuate or initiate a predetermined function or control or to produce a predetermined signal. For purposes of description, the shaft 1 may comprise a portion of the speedometer cable of an automotive vehicle (not shown) or may comprise an adequately journaled shaft to which the speedometer cable of the vehicle may be appropriately coupled.

For purposes of description, the shaft 1 is journaled in bearing bosses 2 and 3. The boss 3 comprises an integral portion of a cup-shaped member 4 having a bottom wall 5 and a side wall 6. The boss 2 may comprise an integral portion of a closure disc 7 which may be mounted upon the upper edge of the wall 6 and may be secured thereto by cement 8 or the like. The bosses 2 and 3 carry external threads 9 and 10 respectively whereby the housing may be mounted upon or coupled to the sheath of the speedometer cable.

The housing 4 thus provides a substantially closed compartment 11. Within the compartment 11 a circular driving disc 12 is carried upon shaft 1 and is secured thereto by means of key 13 whereby the disc 12 will rotate with shaft 1. A similar disc 14 is carried within the compartment 11 and is mounted upon shaft 1 in spaced relationship to the disc 12, the disc 14 being keyed to the shaft 1 by means of key 15 whereby said disc also rotates with shaft 1.

A driven disc 16 circumscribes shaft 1 and is positioned in substantially plane-parallel relationship between and with respect to the driving discs 12 and 14. The driven disc is provided with a relatively enlarged central bore 17 through which shaft 1 extends, the bore 17 being of such diameter as to permit radial movement of the driven disc 16 with respect to shaft 1 and also with respect to the discs 12 and 14.

Between disc 12 and disc 16 and also between disc 14 and disc 16 a plastic material 18 is positioned. The material 18 is preferably a material having a relatively high viscosity and relatively high shear strength and preferably comprises a silicone oil, grease or paste having a consistency above about 200,000 centistokes. Of course, other materials may be employed instead of silicone such as industrial greases having relatively high viscosities in the neighborhood of 600 $w$. The function of the material 18 is to form a yieldable resistance between the opposed surfaces of the driving discs 12 and 14 and the driven disc 16 whereby rotation of the shaft 1 will tend, through the viscous adherence of the material 18 to the opposed surfaces and the shear resistance of said material to rotate the driven disc 16. In addition, the material 18 also tends to inhibit radial movement of the driven disc 16 with respect to the discs 12 and 14.

Adjoining compartment 11 and defined by walls 19 and 20, which are virtually portions of the lateral wall 6 of the housing 4, is a compartment 21 which opens into the compartment 11. An electric switch 22 is positioned in the compartment 21 and comprises a base plate 23 which is secured to the inner face of the wall 20. The base plate 22 carries a bracket 24 which extends inwardly with respect to the compartment 21. A switch arm 25 is pivotally mounted upon the bracket 24 and said arm is biased by a leaf spring 25. A contact point 26 is mounted upon plate 23 in juxtaposed position with respect to contact point 27 carried by the switch arm 23. The bracket 24 is connected to a conductor 28 which, in turn, connects with an external control circuit (not shown). The contact point 26 is also connected to a conductor 29 which is connected exteriorly of the housing 4 to the circuit which comprises conductor 28. Thus, when the contact points 26 and 27 are in contact with each other the circuit between conductors 28 and 29 is completed.

A pressure arm 30 is pivotally mounted upon the bracket 24 and is pivotally associated with the switch arm 23. The pressure arm 30 is provided with a bent extension 31 adjacent its end portion which extends toward the peripheral edge of the driven disc 16 and makes contact therewith under the resilient force of spring 25. The arrangement is such that pivotal movement of the pressure arm 30 will separate or bring together the contact points 26 and 27.

Figure 2:
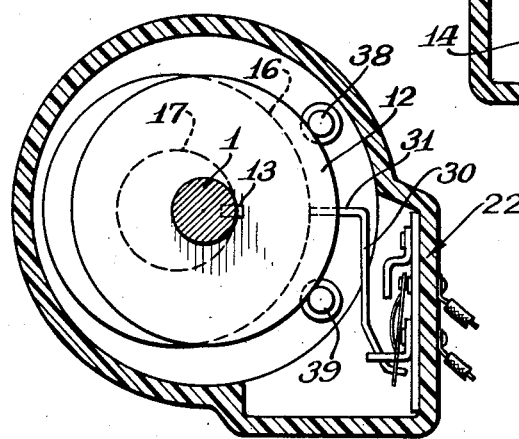
Fig. 2 is a transverse sectional view taken on line 2—2 of Fig. 1 showing the driven rotor in eccentric position.

When the shaft 1 is stationary the pressure arm 31 bears upon the periphery of the driven disc 16 and under the influence of spring 25 said pressure arm urges the disc radially to an eccentric position with respect to shaft 1 and discs 12 and 14. This position is best shown in Figs. 1 and 2. When the pressure arm 30 and disc 16 are in the positions described, contact points 26 and 27 are closed and the circuit comprising conductors 28 and 29 is completed. Obviously, the spring 25 is of sufficient strength to move the disc 16 to its eccentric position against the resistance offered by the viscous material 18.

As will be hereinafter described in detail, when shaft 1 rotates, disc 16 tends to rotate with the driving discs 12 and 14. If the rate of rotation is sufficiently high coupled with the adhesive strength and shear strength of the material 18, the tendency of the disc 16 to rotate with the discs 12 and 14 will overcome the radial force exerted by the arm 30 upon the disc. In other words, rotation of the shaft 1 will tend to move the driven disc 16 to the right as viewed in Figs. 1 and 2 and thus will tend to resist the pressure arm 30 and open switch 22.

For a clear understanding of the operation of the device, reference is made to the diagrammatic Figs. 8 to 12 inclusive.

In Figs. 8 to 12, inclusive, a disc arrangement such as has been hereinbefore described, is shown wherein 32 corresponds to driving disc 12 and 33 corresponds to the driven disc 16. In view of the fact that the views of Figs. 8 to 12 inclusive are top plan views, the disc corresponding to driving disc 14 is not shown, but it is intended that such disc is contemplated. In further reference to said diagrammatic Figs. 8 to 12 inclusive, the reference numeral 34 corresponds to shaft 1 and spring 35 corresponds to the resiliently impelled pressure arm 30.

For purposes of illustration, numerical figures will be employed to indicate proportionately the respective actions involved, but it is to be understood that such numerical figures are not to be considered in a limiting fashion, but are employed to more strikingly bring out the nature of the forces involved.

It is assumed that shaft 34 is stationary and that the force of spring 35 is such, coupled with the physical characteristics of the material 18 between the discs, as to viscosity and shear strength, that the disc 33 will be displaced a distance of sixty thousandths of an inch from its concentric position in a period of 6 seconds. That is, the material 18 between the discs is sheared at the above-mentioned rate. The disc 33 will then be displaced, as shown in Fig. 8.

In Fig. 9, after displacement of disc 33, as indicated in Fig. 8, shaft 34 is continuously rotated at a speed of 90° per 6 seconds. Disc 33 will then occupy a position somewhat as shown in Fig. 9, that is, the resistance of the material 18 will cause the disc 33 to be displaced to the right, as viewed in said figure and in a direction in opposition to spring 35. The latter displacement will then be thirty thousandths of an inch. All of the discs will rotate, but the relative axial positions of the driving and driven discs will remain substantially constant, as shown in Fig. 9.

Incidentally, one of the advantages of employing silicone oil, grease or paste as the material 18, is that their viscosity and shear strengths vary only slightly with rate of shear.

In Fig. 10 it is assumed that the position of the parts is as shown in Fig. 8 and the shaft 34 is rotated through an angle of 180° at a rate of 180° per 6 seconds. The rotation of the shaft will then displace the disc 33 as indicated in Fig. 10, that is, disc 33 will be almost concentric with shaft 34. Continued rotation will maintain the parts in substantially this position. At about this speed, for the constants used, the disc 34, that is, disc 16 will act to initially open switch 22 and to this extent the critical speed of the device is substantially reached, that is, the speed at which the switch 22 initially acts.

In Fig. 11 it is assumed that the shaft 34 has been rotated from the position shown in Fig. 8 through 180° and that the rate of rotation is 180° per 3 seconds, that is, twice the speed contemplated in Fig. 10. It will be noted that the disc 38, originally eccentric away from spring 35, sixty thousandths of an inch, in rotating 180° from its initial position is eccentric thirty thousandths of an inch toward spring 35. If the shaft 34 continues to rotate disc 38 will continue to remain eccentric thirty thousandths of an inch with respect to shaft 34 and this eccentric relationship will persist although the angular eccentricity of the disc 33 will continuously change with respect to spring 35.

Thus, with the physical constants of the material 18 remaining the same, an increase in shaft speed will cause the disc 33 to continuously shift radially with respect to shaft 34 to a predetermined degree of eccentricity which changes as a predetermined critical shaft speed is reached (approximately in Fig. 10) and thereafter an increase in shaft speed will cause disc 33 to change its eccentric position and also change the angular eccentricity with respect to shaft 34. Therefore, substantial concentricity of disc 33 with respect to shaft 34 can only be secured, under a predetermined set of conditions, at a critical speed.

If it is desired that a predetermined radial shift of disc 33 be adapted, for instance, to actuate switch 22 at a predetermined speed of rotation of shaft 34, such actuation will occur, as illustrated in Fig. 10, at a shaft speed which depends upon the physical constants employed. However, above said speed, the switch will alternately be actuated and deactuated since the angular displacement of disc 33 continuously changes at constant speeds above said critical speed.

To maintain the switch actuated at and above a predetermined critical speed, the following expedient is employed.

Referring particularly to Fig. 12, the condition of the discs is shown at and above a critical speed. In Fig. 12 two fixed stops 36 and 37 are positioned in circumferentially spaced relationship with respect to each other and with respect to spring 35. In the apparatus illustrated in Figs. 1 to 4 inclusive, said stops may take the form of pins 38 and 39, respectively, the pins being fixedly mounted upon the bottom wall 5 of the housing 4. The pins 38 and 39 are so positioned with respect to driving discs 12 and 14 that their outer circumferences are substantially tangent to the peripheries of discs 12 and 14.

Referring again to Fig. 12, if the shaft speed is as indicated for Fig. 10 and the direction of rotation is as indicated by the arrows the substantially balanced forces of the spring 35 versus the viscosity and shear resistance of the material 18 at the speed in question, substantially brings the center of rotation of disc 33 on substantially the same line, at right-angles to the direction of the force of spring 35, with the center of rotation of shaft 34. However, disc 33 will tend to be shifted radially to the right, as viewed in Fig. 10. However, when the discs have rotated substantially 180° from the position of rest, illustrated in Fig. 8, the periphery of disc 33 will encounter stop 37 and said stop will shift the disc 33 into substantial concentricity with shaft 34 where it will remain if the rotary speed is at or above the critical speed. In this case, that is where the disc 33 rotates at its critical speed, the only function of the stop 37 is to laterally shift disc 33 to the left, as viewed in Fig. 10.

If, however, from the position of rest, illustrated in Fig. 8, the speed of rotation exceeds the critical speed, and the parts move as indicated by the arrows, stop 37 will exert two reactive forces against the disc 33, it will shift the disc to the left and will also prevent the disc from becoming eccentric toward spring 35, thus preventing the condition described with respect to Fig. 11. After the stop 37 has performed this function, disc 33 will remain substantially concentric with shaft 34, that is, switch 22 will remain actuated.

Thereafter, if the speed of shaft 34 is reduced and eventually goes below the critical speed, the force of spring 35 will again overbalance the viscosity-shear-speed resistance, hereinbefore described, and the disc 33 will be moved by said spring to an eccentric position away from spring 33. Switch 22 will then be deactuated.

If the direction of rotation of shaft 34 is the reverse of that indicated and speeds at and above the critical speed is encountered, stop 36 will function in the same manner as has been described with respect to stop 37. In addition, by the use of the two stops, equally spaced from the radial urging force of spring 35 a smoother operating device results which will not be susceptible to extraneous vibrations, impacts or the like.

Inasmuch as the critical speed at which the device initiates its action, such as, to actuate switch 22, is dependent upon the balance of two forces, i. e. the spring force versus the viscosity-shear-speed force, said critical speed may be varied over relatively wide ranges by selecting a material whose viscosity and shear resistances are suitable. In addition, the viscosity-shear-speed force is dependent upon the juxtaposed areas of the discs 12, 14 and 16 and also by the spacing of said areas since this force is proportional to the juxtaposed areas and is inversely proportional to the thickness of the layers 18. Thus, these factors may also be varied to change the critical speed.

In addition, in order to use a switch 22, for instance, which is rugged and not too delicate, it is preferable that the material 18 have an appreciable viscosity and shear strength. Of course, materials which approach the shear strength of true liquids will only react against a most delicate opposing force and in most usages this is undesirable. Further, a material whose viscosity and shear strength remains substantially constant with varying rates of shear is usually desirable and preferred. Also a material whose viscosity and shear strength are not materially affected by temperature changes is most desirable.

Referring particularly to Figs. 5 and 6, a modification of the present invention is illustrated wherein 40 indicates a housing having a bottom wall 41 and the side wall 42. The housing 40 is cup-shaped and carries a closure disc 43 at its upper portion whereby a compartment 44 is provided within the housing. The bottom wall 41 carries a tubular extension 45 and the closure disc 43 carries a similar extension 46 and a rotating shaft 47 is journaled in said extensions. The shaft 47 corresponds to the shaft 1, hereinbefore described, and may be driven in the manner of driving shaft 1.

A disc 48 is positioned within the compartment 44 and is mounted upon shaft 47, being keyed to said shaft by means of key 49. A similar disc 50 is also positioned within the compartment 44 and is carried by shaft 47 in spaced relationship to the disc 48, disc 50 being keyed to shaft 47 by means of key 51. A disc 52 circumscribes shaft 47, and is provided with a relatively enlarged central aperture 53 through which shaft 47 passes. The disc 52 is freely rotatable with respect to shaft 47 and is also laterally movable a limited degree with respect to said shaft. A plastic material 54 is positioned between the juxtaposed surfaces of disc 48 and disc 52 and also between the juxtaposed surfaces of discs 50 and 52, the material 54 being similar to the material 18, hereinbefore described.

A boss 55 is formed integral with the wall 42 of the housing 40 and an arcuate cantilever spring 56 is mounted at one end upon the boss 55, being secured thereto by rivets 57. The opposite end of the spring 56 carries a contact finger 58 which bears resiliently against the periphery of disc 52.

A screw 59 is positioned through wall 42 opposite contact finger 58, said screw at its inner end carrying an abutment 60 and at its opposite end carrying nuts 61 which secure the screw in fixed position in the wall of the housing and also provide a binding post to which an electrical conductor 62 is connected. The conductor 62 may be connected at its opposite end to a suitable electric control circuit (not shown). Conductor 63 connects with one of the rivets 57 and thus makes electrical contact with spring 56 which in turn makes electrical contact through finger 58 with the disc 52. The disc 52 is constructed of metal and hence when the disc is in eccentric position as illustrated in Figs. 5 and 6 the circuit comprising conductors 62 and 63 is completed from spring 56 through disc 52 to screw 59.

A pair of pins 63' are mounted upon the bottom 41, said pins being disposed substantially tangentially with respect to the periphery of the disc 50. The pins 63' are circumferentially spaced from each other and are preferably disposed at equal distances on each side of the contact finger 58.

The operation of the device illustrated in Figs. 5 and 6 is substantially similar to that hereinbefore described with regard to the device illustrated in Figs. 1 to 4 inclusive and diagrammatically explained with respect to Figs. 8 to 12 inclusive. In the modified form of the invention, however, the circuit to which conductors 62 and 63 is connected is actuated when the disc 52 is in its outermost eccentric position with respect to shaft 47 and discs 48 and 50. In this position the electrical circuit is completed from contact finger 58 through disc 52 and to the abutment 60. When the shaft 47 is stationary the disc 52 is held in its limited eccentric position, hereinbefore described, by means of the resiliency of spring 56. Depending upon the viscosity and shear strength of the material 54 the force exerted by the contact finger 58 is opposed to a greater or lesser degree depending upon the rate of rotation of the shaft 47.

As has been hereinbefore described, with respect to Figs. 8 to 12 inclusive, when the shaft 47 rotates, the material 54 carried between the discs 48 and 52 and 50 and 52 is subjected to a force of shear and at a predetermined rate of rotation of the shaft 47 the force opposing the force of spring 56 will eventually overcome the force of said spring and disc 52 will tend to move into a more concentric position with respect to shaft 47. The abutment 60 may be a fixed abutment in which case as soon as disc 52 tends to move to a more concentric position with respect to shaft 47 the external electric circuit will be broken. However, if desired, the abutment 60 may be spring pressed which will cause said abutment to follow the movement of the disc 52 for a predetermined distance radially inwardly towards the axis of shaft 47.

The device shown in Figs. 5 and 6 functions in substantially the same fashion as has been hereinbefore described with respect to the device illustrated in Figs. 1 to 4 inclusive and the critical speed at which the modified device will operate will also depend upon the physical characteristics of the material 54, the juxtaposed areas of the discs 48 and 52 and discs 50 and 52 and the thickness of the layer of the material 54.

If desired, a pair of permanent magnets indicated in dotted lines in Fig. 6 at 64 may be carried upon the inner wall of the housing 40. If the disc 52 is constructed of a ferro-magnetic metal the magnets 64 will exert a force upon the disc 52 which acts in substantially the same direction as the force exerted by the spring 56 upon said disc.

Referring particularly to Fig. 7, another modified form of the invention is illustrated. In the form of the invention shown in Fig. 7 all of the parts are substantially the same as the parts hereinbefore described. However, in this form of the invention the force-producing members 31 and 58 have been eliminated and radial force is exerted upon the eccentrically movable disc 65 by means of magnets 66 carried by screws 67 which are positioned in spaced relationship in the wall 68 of the housing which carries the device. The magnet 66 in addition to functioning as the force impelling members, additionally function as contact members and said magnets may be connected to an external electrical circuit by means of conductors 59 which are connected to screws 67.

Of course, in this form of the invention the eccentrically movable disc 65 is constructed of an electrically conductive ferro-magnetic material.

When the device illustrated in Fig. 7 is in its stationary position the disc 65 is attracted to the magnets 66 and the circuit comprising conductors 69 is thus completed through disc 65. Although not shown, a material similar to the material 18 and 54 is positioned between the opposite surfaces of disc 65 and an upper disc 70 (the lower disc not being shown). Pins 71 similar to pins 38 and 39 and 63' are positioned adjacent the periphery of the driving discs and function in the same manner as has been described in conjunction with pins 38, 39 and 63'.

When shaft 72 rotates, thereby rotating the upper driving disc 70 and the lower driving disc, a force is exerted through the agency of the material interposed between the discs upon the eccentrically movable disc 75 and when said force reaches a value in excess of the attractive force of the magnets 66, the disc 65 tends to move toward a concentric position. In this fashion at a predetermined rate of rotation of shaft 72 the circuit comprising the conductors 69 is broken. When the rate of rotation of the shaft 72 becomes less than the critical speed of said shaft or when shaft 72 completely stops, the disc 65 is drawn to its eccentric position in contact with the magnets 66 and thus the external circuit is again actuated.

Although three forms of the present invention have been illustrated it will be clear that other forms of the invention may be suggested to those skilled in the art without departing from the spirit of the invention and hence it is not intended that the present invention be limited except as necessitated by the appended claims.

I claim as my invention:

1. In a control device comprising a rotatable body, a pair of driving plates secured to said rotatable body in axial spaced relationship to each other, a driven plate loosely embracing said rotatable body between said driving plates and in face-to-face relationship with said driving plates, means disposed adjacent the periphery of said driven plate for exerting a radial force upon said driven plate to hold said driven plate in an eccentric position relative to said rotatable body when the latter is stationary, and means for frictionally engaging the opposed faces of said driven plate and said respective driving plates for rotating said driven plate and radially moving said driven plate to a substantially concentric position with respect to said rotatable body in opposition to the force exerted by said first-mentioned means when the body rotates at a predetermined speed.

2. In a control device comprising a rotatable body, a pair of circular driving discs secured to said rotatable body in axial spaced relationship to each other, a circular driven disc loosely embracing said rotatable body between said driving discs and in face-to-face relationship with said driving discs, means disposed adjacent the periphery of said driven disc for exerting a radial force upon said driven disc to hold said driven disc in an eccentric position relative to said rotatable body when the latter is stationary, and means for frictionally engaging the opposed faces of said driven disc and said respective driving discs for rotating said driven disc and radially moving said driven disc to a substantially concentric position with respect to said rotatable body in opposition to the force exerted by said first-mentioned means when the body rotates at a predetermined speed.

3. In a control device comprising a rotatable body, a pair of circular driving discs secured to said rotatable body in axial spaced relationship to each other, a circular driven disc loosely embracing said rotatable body between said driving discs and in face-to-face relationship with said driving discs, means disposed adjacent the periphery of said driven disc for exerting a radial force upon said driven disc to hold said driven disc in an eccentric position relative to said rotatable body when the latter is stationary, and means for frictionally engaging the opposed faces of said driven disc and said respective driving discs for rotating said driven disc and radially moving said driven disc to a substantially concentric position with respect to said rotatable body in opposition to the force exerted by said first-mentioned means when the body rotates at a predetermined speed and a stationary abutment disposed adjacent the periphery of said driving discs to prevent substantial eccentric movement of said driven disc in a direction substantially opposed to the force exerted by said first-mentioned means.

4. In a control device comprising a rotatable body, a pair of driving plates rigidly secured to said rotatable body in axial spaced relationship to each other, a driven plate loosely embracing said rotatable body and radially and circumferentially movably disposed between and in plane-parallel face-to-face relationship with said driving plates, means disposed adjacent the periphery of said driven plate for exerting a radial force upon said driven plate to hold said driven plate in an eccentric position relative to said rotatable body when the latter is stationary, a plastic material having a predetermined viscosity and shear strength disposed between and in contact with the respective opposed faces of said driving and driven plates for rotating said driven plate and radially moving said driven plate to a substantially concentric position with respect to said rotatable body in opposition to the force exerted by said means when said body rotates at a predetermined speed.

5. In a control device comprising a rotatable body, a pair of driving plates rigidly secured to said rotatable body in axial spaced relationship to each other, a driven plate loosely embracing said rotatable body and radially and circumferentially movably disposed between and in plane-parallel face-to-face relationship with said driving plates, means disposed adjacent the periphery of said driven plate for exerting a radial force upon said driven plate to hold said driven plate in an eccentric position relative to said rotatable body when the latter is stationary, a plastic silicone material having an appreciable viscosity and shear strength disposed between and in contact with the respective opposed faces of said driving and driven plates for rotating said driven plate and radially moving said driven plate to a substantially concentric position with respect to said rotatable body in opposition to the force exerted by said means when said body rotates at a predetermined speed.

6. In a control device comprising a rotatable shaft, a pair of circular driving plates rigidly secured to said rotatable body in axial spaced relationship to each other, a circular driven plate loosely embracing said rotatable body and radially and circumferentially movably disposed between and in plane-parallel face-to-face relationship with said driving plates, means disposed adjacent the periphery of said driven plate for exerting a radial force upon said driven plate to hold said driven plate in an eccentric position relative to said rotatable body and driving plates when the latter are stationary, a plastic material having an appreciable viscosity and shear strength disposed between and in adhesive contact with the respective opposed faces of said driving and driven plates for rotating said driven plate and radially moving said driven plate to a substantially concentric position with respect to said rotatable body in opposition to the force exerted by said means when said driving plates rotate at a predetermined speed.

7. In a control device comprising a rotatable body, a pair of driving plates rigidly secured to said rotatable body in axial spaced relationship to each other, a driven plate loosely embracing said rotatable body and radially and circumferentially movably disposed between and in plane-parallel face-to-face relationship with said driving plates, resiliently urged means disposed adjacent the periphery of said driven plate for exerting resiliently a radial force upon said driven plate to hold said driven plate in an eccentric position relative to said rotatable body when the latter is stationary, a plastic material having an appreciable viscosity and shear strength disposed between and in adhesive contact with the respective opposed faces of said driving and driven plates for rotating said driven plate and radially moving said driven plate to a substantially concentric position with respect to said rotatable body in opposition to the force exerted by said resiliently urged means when said driving plates rotate at a predetermined speed.

8. In a control device comprising a rotatable body, a pair of driving plates rigidly secured to said rotatable body in axial spaced relationship to each other, a driven plate loosely embracing said rotatable body and radially and circumferentially movably disposed between and in plane-parallel face-to-face relationship with said driving plates, resiliently urged means disposed adjacent the periphery of said driven plate for exerting resiliently a radial force upon said driven plate to hold said driven plate in an eccentric position relative to said rotatable body when the latter is stationary, a plastic material having an appreciable viscosity and shear strength disposed between and in adhesive contact with the respective opposed faces of said driving and driven plates for rotating said driven plate and radially moving said driven plate to a substantially concentric position with respect to said rotatable body in opposition to the force exerted by said resiliently urged means when said driving plates rotate at a predetermined speed and a stop positioned adjacent the peripheries of said driving plates to prevent substantial eccentric movement of said plates in a direction substantially opposed to the direction of force of said resilient means.

9. In a control device comprising a rotatable shaft, a pair of circular driving discs rigidly secured to said shaft in axial spaced relationship to each other, a circular driven disc loosely embracing said shaft and radially and circumferentially movably disposed between and in plane-parallel face-to-face relationship with said driving discs, an electric switch having a resiliently impelled actuating arm in contact with the periphery of the driven disc to urge said driven disc to an eccentric position relative to said driving discs when said shaft is stationary, a plastic material having an appreciable viscosity and shear strength disposed between and in adhesive contact with the respective opposed faces of said discs for rotating said driven disc and radially moving said driven disc to a substantially concentric position with respect to said driving discs in opposition to the resilient impelling force of said switch arm to move said arm and actuate said switch, when said driving discs rotate, and means for connecting said electric switch in an electric control circuit.

10. In a control device comprising a rotatable shaft, a pair of circular driving discs rigidly secured to said shaft in axial spaced relationship to each other, a circular driven disc loosely embracing said shaft and radially and circumferentially movably disposed between and in plane-parallel face-to-face relationship with said driving discs, an electric switch having a resiliently impelled actuating arm in contact with the periphery of the driven disc to urge said driven disc to an eccentric position relative to said driving discs when said shaft is stationary, a plastic material having an appreciable viscosity and shear strength disposed between and in adhesive contact with the respective opposed faces of said discs for rotating said driven disc and radially moving said driven disc to a substantially concentric position with respect to said driving discs in opposition to the resilient impelling force of said switch arm to move said arm and actuate said switch, when said driving discs rotate, means for connecting said electric switch in an electric control circuit, and stop means disposed adjacent the peripheries of said driving discs to prevent substantial eccentric movement of said driven disc with respect to said driving discs in a direction in substantial opposition to the impelling force of said actuating arm.

11. In a control device comprising a rotatable shaft, a pair of circular driving discs rigidly secured to said shaft in axial spaced relationship to each other, a circular driven disc loosely embracing said shaft and radially and circumferentially movably disposed between and in plane-parallel face-to-face relationship with said driving discs, an electric switch having a resiliently impelled actuating arm in contact with the periphery of the driven disc to urge said driven disc to an eccentric position relative to said driving discs when said shaft is stationary, a plastic material having an appreciable viscosity and shear strength disposed between and in adhesive contact with the respective opposed faces of said discs for rotating said driven disc and radially moving said driven disc to a substantially concentric position with respect to said driving discs in opposition to the resilient impelling force of said switch arm to move said arm and actuate said switch, when said driving discs rotate, means for connecting said electric switch in an electric control circuit, and a pair of stops disposed adjacent the peripheries of said driving discs on opposite sides of said actuating arm to prevent substantial eccentric movement of said driven disc with respect to said driving discs in a direction in substantial opposition to the impelling force of said actuating arm.

12. In a control device comprising a rotatable shaft, a pair of circular driving discs rigidly secured to said shaft in axial spaced relationship to each other, a circular driven disc having an electrically conductive periphery loosely embracing said shaft and radially and circumferentially movably disposed between and in plane-parallel face-to-face relationship with said driving discs, a resiliently impelled electric switch contact arm in contact with the periphery of the driven disc to urge said driven disc to an eccentric position relative to said driving discs when said shaft is stationary, a contact member disposed substantially diametrically from said contact arm with which the periphery of said driven disc makes contact when said driving discs are stationary, a plastic material having an appreciable viscosity and shear strength disposed between and in adhesive contact with the respective opposed faces of said discs for rotating said driven disc and radially moving said driven disc to a substantially concentric position with respect to said driving discs in opposition to the resilient impelling force of said contact arm and away from said contact when said driving discs rotate, and means for connecting said contact arm and said contact in an electric control circuit.

13. In a control device comprising a rotatable shaft, a pair of circular driving discs rigidly secured to said shaft in axial spaced relationship to each other, a circular driven disc constructed of ferro magnetic material loosely embracing said shaft and radially and circumferentially movably disposed between and in plane-parallel face-to-face relationship with said driving discs, a pair of spaced magnets disposed adjacent the periphery of said driven disc in contact with the periphery of the driven disc to hold said driven disc in an eccentric position relative to said driving discs when said shaft is stationary, a plastic material having an appreciable viscosity and shear strength disposed between and in adhesive contact with the respective opposed faces of said discs for rotating said driven disc and radially moving said driven disc to a substantially concentric position with respect to said driving discs in opposition to the attractive force of said magnets when said driving discs rotate, and means for connecting said magnets to opposite sides of an electric control circuit.

References Cited in the file of this patent

UNITED STATES PATENTS

| | | |
|---|---|---|
| 2,096,069 | Seiden | Oct. 19, 1937 |
| 2,640,899 | Dickey | June 2, 1953 |